(12) United States Patent
Abe et al.

(10) Patent No.: US 11,095,099 B2
(45) Date of Patent: Aug. 17, 2021

(54) GAS-INSULATED SWITCHING DEVICE

(71) Applicant: Mitsubishi Electric Corporation, Tokyo (JP)

(72) Inventors: Junichi Abe, Tokyo (JP); Tadahiro Yoshida, Tokyo (JP); Shintaro Yamada, Tokyo (JP); Takao Tsurimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/965,842

(22) PCT Filed: Mar. 14, 2018

(86) PCT No.: PCT/JP2018/009864
§ 371 (c)(1),
(2) Date: Jul. 29, 2020

(87) PCT Pub. No.: WO2019/175999
PCT Pub. Date: Sep. 19, 2019

(65) Prior Publication Data
US 2021/0057890 A1 Feb. 25, 2021

(51) Int. Cl.
*H02B 13/035* (2006.01)
*H01H 33/56* (2006.01)
*H01H 33/662* (2006.01)

(52) U.S. Cl.
CPC ....... *H02B 13/0354* (2013.01); *H01H 33/565* (2013.01); *H01H 33/66207* (2013.01);
(Continued)

(58) Field of Classification Search
CPC .............. H02B 13/0354; H02B 13/045; H01H 33/565; H01H 33/66207; H01H 33/66238; H01H 33/666; H01H 2033/66223
(Continued)

(56) References Cited

U.S. PATENT DOCUMENTS 6,865,072 B2 * 3/2005 Sato ................... H02B 13/0354
218/155
9,136,674 B2 * 9/2015 Ohtsuka ............. H02B 13/0354
(Continued)

FOREIGN PATENT DOCUMENTS

JP 2004220922 A 8/2004
JP 2007306701 A 11/2007
(Continued)

OTHER PUBLICATIONS

International Search Report (PCT/ISA/210) dated Jun. 12, 2018, by the Japan Patent Office as the International Searching Authority for International Application No. PCT/JP2018/009864.
(Continued)

*Primary Examiner* — William A Bolton
(74) *Attorney, Agent, or Firm* — Buchanan Ingersoll & Rooney PC (57) ABSTRACT

A gas-insulated switching device including, inside a pressure tank: a vacuum valve having a movable contact provided on one side of a movable conductor, and a fixed contact provided to a fixed conductor; an insulation rod connected to another side of the movable conductor led out through a bellows from the vacuum valve; and an airtight container in which the insulation rod and the other side of the movable conductor are stored, wherein an internal space of the bellows and an internal space of the airtight container communicate with each other, one side of the vacuum valve
(Continued)

is fixed to a tank wall via an insulation support body, another side of the vacuum valve is connected to the tank wall via the airtight container, and the airtight container insulates the vacuum valve and the tank wall from each other, and is slidable in a movable direction of the movable conductor.

11 Claims, 10 Drawing Sheets

(52) U.S. Cl.
CPC ............... *H01H 33/66238* (2013.01); *H01H 2033/66223* (2013.01)

(58) Field of Classification Search
USPC ......... 218/118, 57, 134, 135, 137, 138, 139, 218/140, 155
See application file for complete search history.

(56) References Cited

U.S. PATENT DOCUMENTS

| | | | | |
|---|---|---|---|---|
| 9,355,792 B2* | 5/2016 | Yoshida | ................ | H02B 13/00 |
| 9,472,356 B2* | 10/2016 | Matsunaga | ........ | H02B 13/0354 |
| 9,502,868 B2* | 11/2016 | Kagawa | ................... | H02B 5/06 |
| 2010/0288733 A1 | 11/2010 | Ichikawa et al. | | |
| 2013/0213937 A1 | 8/2013 | Yoshida et al. | | |
| 2014/0076851 A1* | 3/2014 | Yano | ...................... | H01H 33/38 |
| | | | | 218/120 |
| 2015/0244158 A1* | 8/2015 | Fukuoka | ................. | H02G 3/22 |
| | | | | 218/139 |

FOREIGN PATENT DOCUMENTS

| | | |
|---|---|---|
| JP | 2013131440 A | 7/2013 |
| WO | 2012063501 A1 | 5/2012 |

OTHER PUBLICATIONS

Written Opinion (PCT/ISA/237) dated Jun. 12, 2018, by the Japan Patent Office as the International Searching Authority for International Application No. PCT/JP2018/009864.

* cited by examiner

GAS-INSULATED SWITCHING DEVICE

TECHNICAL FIELD

The present disclosure relates to a gas-insulated switching device mainly provided to a transmission and distribution grid for power.

BACKGROUND ART

A switching device which is provided to a transmission and distribution grid for power and opens/closes a circuit, in the case of having a rated voltage of several kV or higher, is placed inside a pressure tank in which insulation gas is sealed, so as to improve insulation performance for creeping, etc. As the insulation gas, $SF_6$ gas which is excellent in insulation performance has been mainly used. However, $SF_6$ gas is greenhouse gas that is very high in global warming potential, and therefore discharge thereof to the atmosphere is restricted at present. As insulation gas that is low in global warming potential and substitutes for $SF_6$ gas, for example, gas such as dry air, $CO_2$, or $N_2$ is desired to be used. These insulation gases are lower in insulation performance than $SF_6$ gas. Therefore, it is necessary to make adjustment such as increasing the gas pressure in the pressure tank than in the case of $SF_6$ gas.

The switching device is provided with a bellows, together with a movable conductor for opening/closing a circuit. In the case where the switching device is a vacuum circuit breaker, the inside of a container of the circuit breaker is kept vacuum, and when the tank inside pressure is increased, the bellows is subjected to the difference pressure between the vacuum and the tank inside pressure. Therefore, the strength of the bellows becomes a problem.

To address the above problem, for example, the following structure is known. The internal space of a bellows in a vacuum valve is set as a compartment having an intermediate pressure which is lower than the tank inside pressure and higher than the vacuum, whereby the difference pressure to the bellows is reduced, and thus the vacuum valve in which the strength of the bellows need not be increased is provided in the pressure tank (see, for example, Patent Document 1).

CITATION LIST

Patent Document

Patent Document 1: WO2012/063501

SUMMARY OF THE INVENTION

Problems to be Solved by the Invention

In Patent Document 1, an insulation support body is provided as an airtight container in which a movable conductor and an insulation rod connected to the movable conductor are stored, the internal space of the bellows and the internal space of the insulation support body communicate with each other, and the communicating space is set as an airtight compartment having an intermediate pressure. Therefore, it is not necessary to increase the strength of the bellows. However, the vacuum valve is connected to the insulation support body fixed to a tank wall, and impact when the vacuum valve is opened/closed, in particular, impact when the vacuum valve is closed, is directly transferred from the vacuum valve to the insulation support body. Therefore, there is a problem that the insulation support body is required to have a strength and a structure that withstands the impact while ensuring airtightness.

Solution to the Problems

A gas-insulated switching device according to the present disclosure is a gas-insulated switching device including, inside a pressure tank: a vacuum valve having, in a vacuum, a movable contact provided on one side of a movable conductor, and a fixed contact provided to a fixed conductor; an insulation rod connected to another side of the movable conductor led out through a bellows from the vacuum valve; and an airtight container in which the insulation rod and the other side of the movable conductor are stored, wherein an internal space of the bellows and an internal space of the airtight container communicate with each other, one side of the vacuum valve is fixed to a tank wall of the pressure tank via an insulation support body, another side of the vacuum valve is connected to the tank wall via the airtight container, the airtight container insulates the vacuum valve and the tank wall from each other and includes a first airtight container member and a second airtight container member, and the first airtight container member and the second airtight container member are slidable with each other in a movable direction of the movable conductor.

Effect of the Invention

The gas-insulated switching device according to the present disclosure suppresses propagation of impact when the vacuum valve is opened/closed, and thus can improve reliability of the intermediate pressure compartment.

DESCRIPTION OF EMBODIMENTS

Hereinafter, a gas-insulated switching device according to embodiments will be described with reference to the drawings, while the same or corresponding members or parts in the drawings are denoted by the same reference characters.

Embodiment 1

Figure 1:
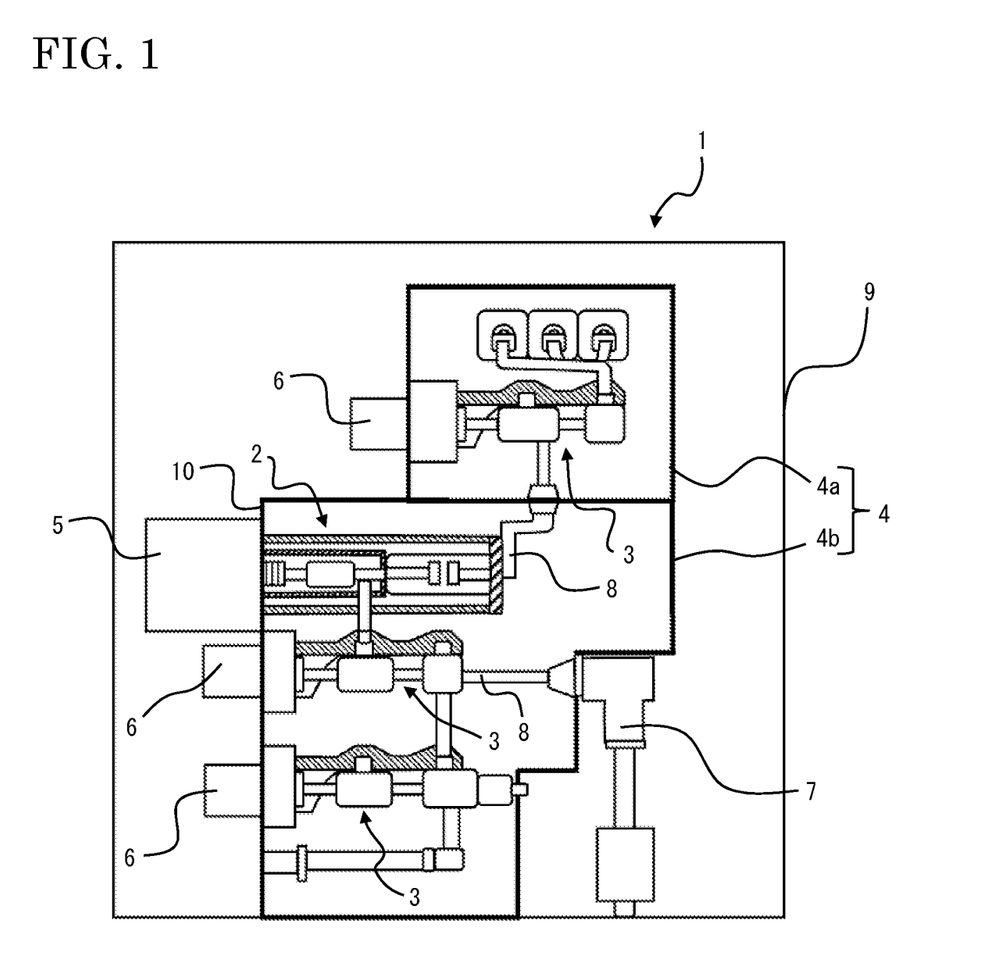
FIG. 1 is a sectional view schematically showing an entire gas-insulated switching device according to embodiment 1.

The schematic structure of a gas-insulated switching device 1 according to embodiment 1 will be described. FIG.

Figure 2:
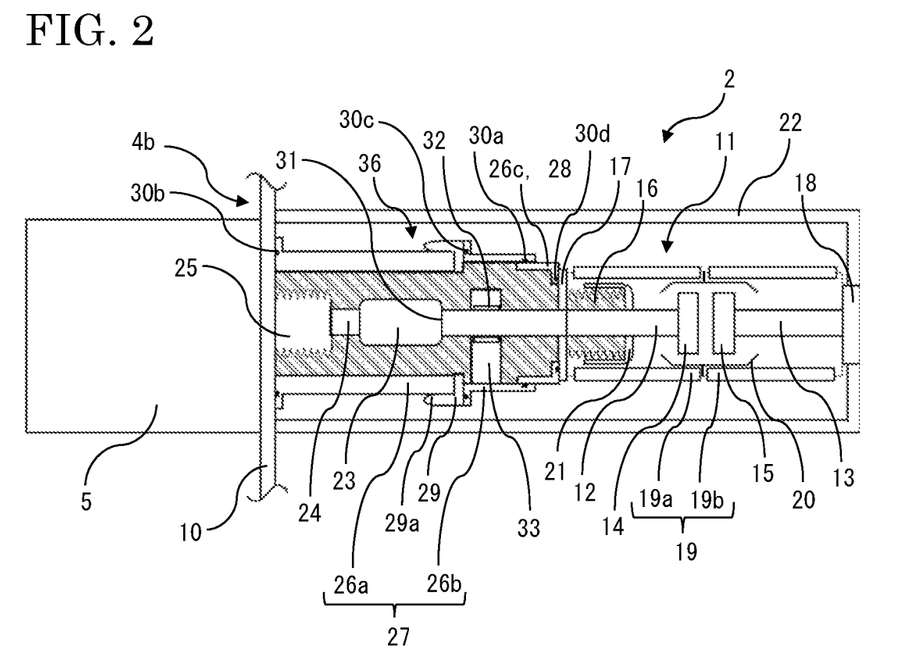
FIG. 2 is an enlarged sectional view of a part of the gas-insulated switching device according to embodiment 1.

1 is a sectional view schematically showing the entire gas-insulated switching device 1, and FIG. 2 is an enlarged sectional view of a circuit breaker 2, which is a part of FIG. 1. It is noted that the circuit breaker 2 in FIG. 1 is shown in a simplified manner by only its schematic structure.

As shown in FIG. 1, in the gas-insulated switching device 1, pressure tanks 4 are provided inside a cubicle 9 which is a metal housing. In the internal space of the pressure tank 4, insulating gas such as dry air, $CO_2$, or $N_2$ which is low in global warming potential is sealed at a high pressure (hereinafter, referred to as tank inside pressure) of about 0.5 MPa to 0.7 MPa in absolute pressure, for example. The gas-insulated switching device 1 has a structure for leading power introduced through a cable 7, upward in a pressure tank 4a. Inside pressure tanks 4a, 4b, a circuit breaker 2 and a disconnector 3 are connected via a conductor 8. For opening/closing the circuit breaker 2 and the disconnector 3, a circuit breaker drive device 5 and a disconnector drive device 6 provided via a tank wall 10 outside the pressure tank 4 are used. In the case where an electrical fault such as ground fault or short-circuit has occurred in normally flowing current or a power grid, generated fault current is interrupted by the circuit breaker 2, whereby the fault can be prevented from influencing connected peripheral devices.

As shown in FIG. 2, in a vacuum valve 11 which opens/closes a circuit, a movable contact 14 provided on one side of a movable conductor 12 penetrating a bellows 16 and a fixed contact 15 provided on the other side of a fixed conductor 13 are provided so as to be contactable/separable with/from each other in a vacuum inside a cylindrical insulation cylinder 19 made of an insulating material such as ceramic. The insulation cylinder 19 is formed of a movable-side insulation cylinder 19a and a fixed-side insulation cylinder 19b connected to each other via an arc shield 20. The arc shield 20 inhibits a material melted by an arc from adhering to the insulation cylinder 19 at the time of circuit breaking, thereby preventing reduction of insulation performance of the insulation cylinder 19. The bellows 16 is provided to a movable-side end plate 17, and one side of the fixed conductor 13 is joined to a fixed-side end plate 18. The vacuum valve 11 is sealed in an airtight state by the movable-side end plate 17, the fixed-side end plate 18, the insulation cylinder 19, and the bellows 16. In addition, a bellows cover 21 is provided so as to cover the bellows 16. The bellows cover 21 inhibits a material melted by an arc from adhering to the bellows 16 at the time of circuit breaking, thereby preventing damage to the bellows 16 at the time of operation and relaxing an electric field around the bellows 16.

The fixed-side insulation cylinder 19b side of the vacuum valve 11 is fixed to the tank wall 10 via an insulation support body 22. The movable-side insulation cylinder 19a side of the vacuum valve 11 is connected to the tank wall 10 via an airtight container 36 described later. The airtight container 36 insulates the vacuum valve 11 and the tank wall 10 from each other, and is configured to be slidable in the movable direction of the movable conductor 12. The insulation support body 22 is a resin molded body made of an insulating material, for example. Impact when the vacuum valve 11 is opened/closed is given to the insulation support body 22, but the insulation support body 22 is not required to have airtightness. Therefore, for the insulation support body 22, only a strength for retaining the vacuum valve 11 needs to be considered. In the present embodiment, a structure in which the insulation support body 22 is attached to the tank wall 10 is shown. However, the vacuum valve 11 may be attached with use of another structure such as a compact support body made of an insulating material and provided separately in the pressure tank 4b.

The insulation rod 23 is connected to the movable conductor 12 led out through the bellows 16, on one side, and is connected to an operation rod 24 on the other side. The insulation distance between the movable conductor 12 and the operation rod 24 is ensured by interposition of the insulation rod 23.

The operation rod 24 is connected to the circuit breaker drive device 5 provided outside the pressure tank 4b, via an airtight member 25 formed from a bellows, for example. The circuit breaker drive device 5 drives the movable conductor 12 via the operation rod 24 and the insulation rod 23, to cause the movable contact 14 to contact with or separate from the fixed contact 15, thereby performing opening/closing. At this time, the bellows 16 follows movement of the movable conductor 12, so that the vacuum inside the vacuum valve 11 is kept.

An airtight container member 26a which is an insulating body made of thermoplastic resin, for example, is fixed to an airtight container member 26b via an electric field relaxing shield 29, on one side, and is fixed to the tank wall 10 on the other side. An airtight container member 26c is fixed to the movable conductor 12 side of the vacuum valve 11. In the present embodiment, the airtight container member 26a and the airtight container member 26b form a first airtight container member 27, the airtight container member 26c forms a second airtight container member 28, and the first airtight container member 27 and the second airtight container member 28 form the airtight container 36. The airtight container 36 stores therein the insulation rod 23, the operation rod 24, the movable conductor 12 led out through the bellows 16, and a connection portion 31 between the movable conductor 12 and the insulation rod 23. The first airtight container member 27 and the second airtight container member 28 are cylindrical-shaped members having diameters different from each other, and are slidably engaged with each other in parallel to the movable direction of the movable conductor 12 while being kept in an airtight state via an elastic airtight seal member 30a. The airtight seal member 30a is fitted into a groove provided in the inner wall surface of the airtight container member 26b. The internal space of the bellows 16, the internal space of the airtight container member 26c, the internal space of the airtight container member 26b, the internal space of the electric field relaxing shield 29, and the internal space of the airtight container member 26a communicate with each other, and thus are formed as a communicating space (hatched part in FIG. 2). The communicating space is formed as a compartment in which the pressure (hereinafter, referred to as communicating space inside pressure) inside the communicating space is an intermediate pressure higher than the atmospheric pressure and lower than the tank inside pressure, and filled with insulation gas such as dry air, $CO_2$, or $N_2$ which is low in global warming potential. For the purpose of keeping airtightness in the communicating space, airtight seal members 30a to 30d are provided at connection portions between parts.

The airtight container member 26a is formed of an insulating material to insulate the vacuum valve 11 and the pressure tank 4b from each other. The airtight container member 26b and the airtight container member 26c are not limited to insulating materials, but may be made of metal. It is noted that the airtight container member 26a, the airtight container member 26b, and the airtight container member 26c are designed so as to have a strength that can withstand the difference pressure between the communicating space inside pressure and the tank inside pressure.

The airtight seal members 30a to 30d are made of an elastomer which is lower in cost than an airtight seal member made of metal. In the present embodiment, these airtight seal members are formed in a shape of an O ring, a T ring, or an X ring which can easily ensure airtightness by being fitted into a groove. However, other shapes may be adopted. The airtight member 25 is formed as a bellows to keep airtightness in the communicating space, but is not limited thereto as long as airtightness can be kept.

The electric field relaxing shield 29 is provided so as to surround the connection portion 31 for the purpose of relaxing an electric field at the connection portion 31 between the movable conductor 12 and the insulation rod 23 subjected to the communicating space inside pressure lower than the tank inside pressure, and a creeping electric field at the insulation rod 23. The electric field relaxing shield 29 is formed from metal such as SUS, iron, copper, brass, or aluminum, for example. An end portion 29a of the electric field relaxing shield 29 is located on the outer side of the airtight container member 26a. The position of the end portion 29a is set to be located on the tank wall 10 side with respect to the connection portion 31 when the vacuum valve 11 is opened, whereby an electric field at the connection portion 31 can be effectively relaxed.

The movable conductor 12 is connected to another device in the pressure tank 4b by a connection conductor 33 connected via an energization terminal 32. The energization terminal 32 is formed from, for example, a shunt conductor or a slide contact so as to allow energization even when the movable conductor 12 is driven. Although not shown in FIG. 2, the connection conductor 33 is formed by, for example, a current introduction terminal so as to protrude from the communicating space into the pressure tank 4b while the communicating space inside pressure is maintained. The fixed conductor 13 is connected to the conductor 8 shown in FIG. 1 via the fixed-side end plate 18.

As described above, in the gas-insulated switching device 1, the first airtight container member 27 and the second airtight container member 28 are cylindrical-shaped members having diameters different from each other, and are slidably engaged with each other in parallel to the movable direction of the movable conductor 12 while being kept in an airtight state via the elastic airtight seal member 30a. Thus, propagation of impact to the airtight container 36 caused when the vacuum valve 11 is opened/closed is suppressed, and therefore measures for the strength of the airtight container 36 are less needed while airtightness is ensured. In addition, even if the airtight container 36 extends due to temperature or the like, the insulation support body 22 is not influenced. Thus, stress caused by the difference in linear expansion coefficient between the insulation support body 22 and the airtight container 36 can be released, and reliability of the intermediate pressure compartment can be improved. In addition, the communicating space inside pressure is set to be higher than the atmospheric pressure. Therefore, insulation performance in the communicating space can be improved as compared to the case where the communicating space inside pressure is the atmospheric pressure. In addition, even in the case where the insulation gas filling the communicating space has leaked, the communicating space inside pressure is lowered to the atmospheric pressure, and thus the gas leakage can be easily confirmed by monitoring the pressure value. In addition, since the communicating space is filled with insulation gas such as dry air, $CO_2$, or $N_2$ which is low in global warming potential, the insulation gas can be easily treated.

It is noted that no airtight seal member 30 is provided between the airtight container member 26a and the electric field relaxing shield 29. This is because they are connected so as to be kept in an airtight state. However, the airtight seal member 30 may be provided therebetween.

The airtight seal member 30a is provided to the groove formed in the inner wall surface of the airtight container member 26b, but without limitation thereto, a groove may be formed in the outer wall surface of the airtight container member 26c and the airtight seal member may be provided to that groove.

Embodiment 2

Figure 3:
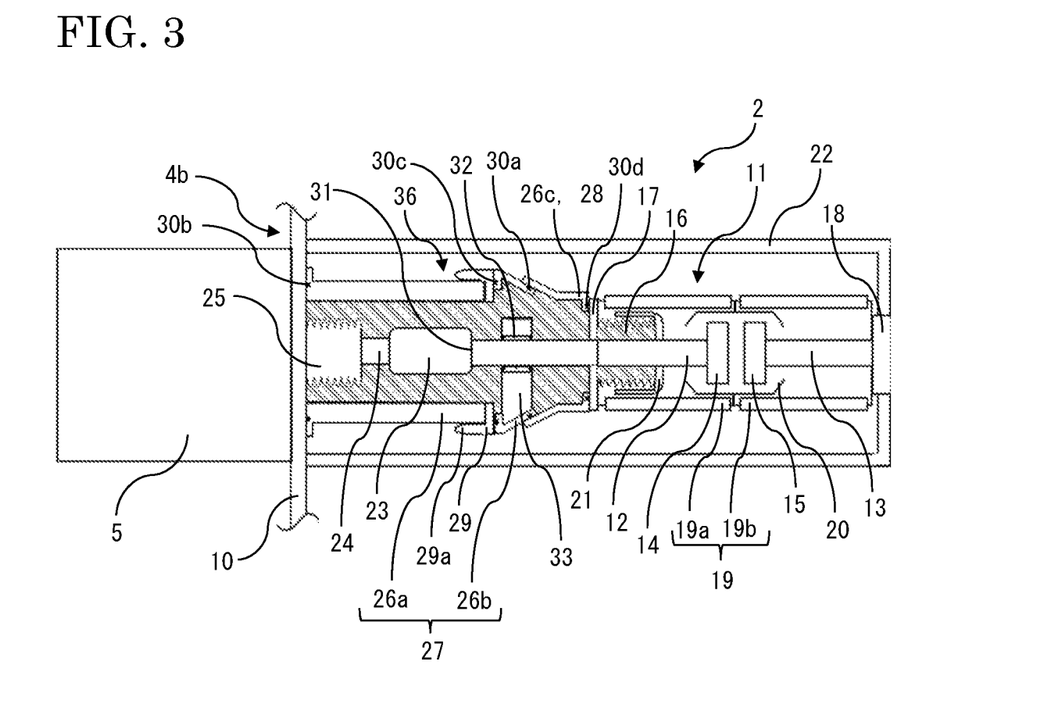
FIG. 3 is an enlarged sectional view of a part of a gas-insulated switching device according to embodiment 2.

The structure of the gas-insulated switching device 1 according to embodiment 2 will be described. FIG. 3 is an enlarged sectional view showing the circuit breaker 2 which is a part of the gas-insulated switching device 1. In embodiment 1, the first airtight container member 27 and the second airtight container member 28 are cylindrical-shaped members having diameters different from each other, and are engaged with each other in parallel to the movable direction of the movable conductor 12 via the elastic airtight seal member 30a. In embodiment 2, the airtight container member 26b forming the first airtight container member 27 and the airtight container member 26c forming the second airtight container member 28 are truncated-cone-shaped members having diameters different from each other, and are slidably engaged with each other in a direction inclined relative to the movable direction of the movable conductor 12, via the elastic airtight seal member 30a. The other components are the same as those described in embodiment 1, and therefore they are denoted by the same reference characters and description thereof is omitted.

The airtight container member 26b has a conical side surface, and the airtight seal member 30a is fitted into a groove formed in an outer-side inclined surface thereof. The airtight container member 26c also has a conical side surface, and is engaged such that the inner-side inclined surface thereof is in contact with the airtight seal member 30a and is opposed to the outer-side inclined surface of the airtight container member 26b.

As described above, the airtight container member 26b and the airtight container member 26c are engaged with each other in a direction inclined relative to the movable direction of the movable conductor 12, via the elastic airtight seal member 30a. Thus, even when the airtight container member 26c slides due to impact to the airtight container 36 caused when the vacuum valve 11 is opened/closed, a force is applied in a direction to tighten the airtight seal member, whereby airtightness in the intermediate pressure compartment can be improved.

Embodiment 3

Figure 4:
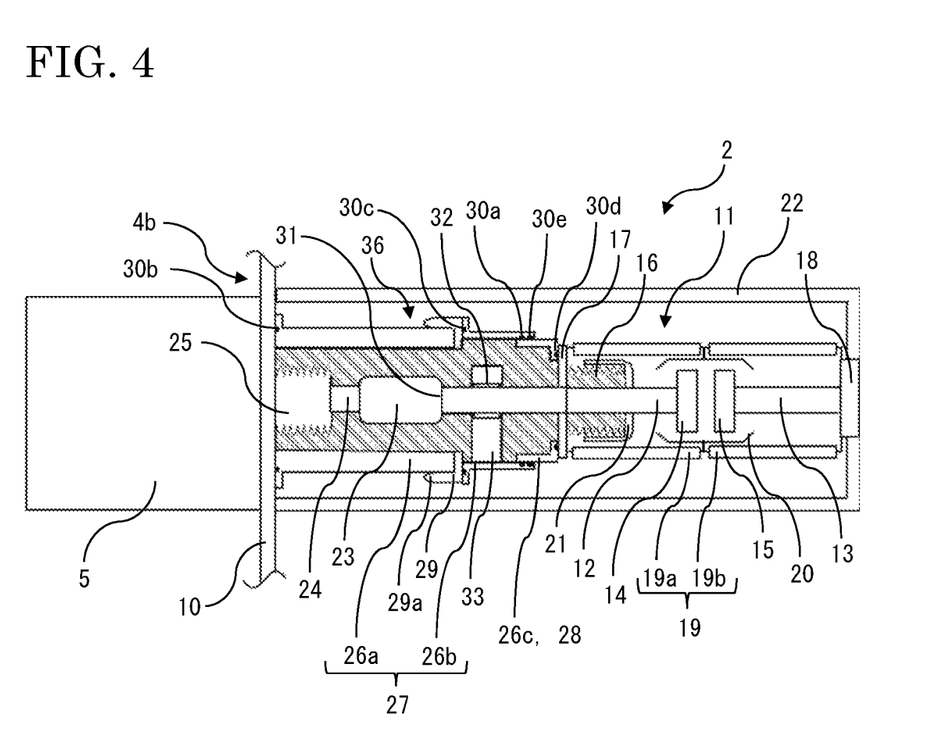
FIG. 4 is an enlarged sectional view of a part of a gas-insulated switching device according to embodiment 3.

The structure of the gas-insulated switching device 1 according to embodiment 3 will be described. FIG. 4 is an enlarged sectional view showing the circuit breaker 2 which is a part of the gas-insulated switching device 1. In embodiment 1, the first airtight container member 27 and the second airtight container member 28 are engaged with each other via one elastic airtight seal member 30a. In embodiment 3, the first airtight container member 27 and the second airtight container member 28 are slidably engaged with each other via two elastic airtight seal members 30a, 30e. The other components are the same as those described in embodiment 1, and therefore they are denoted by the same reference characters and description thereof is omitted.

The airtight container member 26b is a cylindrical-shaped member, and two airtight seal members 30a, 30e are fitted into two grooves formed in the inner wall surface thereof. The airtight container member 26c is a cylindrical-shaped member having a different diameter, and is engaged such that the outer wall surface thereof is in contact with the airtight seal members 30a, 30e and is opposed to the inner wall surface of the airtight container member 26b. Owing to the two elastic airtight seal members 30a, 30e, even if one of them has failed by, for example, being damaged, the other one can keep airtightness for the communicating space inside pressure.

As described above, the first airtight container member 27 and the second airtight container member 28 are engaged with each other via the two elastic airtight seal members 30a, 30e, whereby airtightness for the communicating space inside pressure is improved. Thus, reliability of the intermediate pressure compartment can be improved.

In the present embodiment, two airtight seal members 30a, 30e are provided. However, without limitation thereto, more than two airtight seal members 30 may be provided so as to further improve reliability. In the present embodiment, the airtight seal members 30a, 30e are provided in the grooves formed in the airtight container member 26b. However, without limitation thereto, grooves may be formed in the airtight container member 26c and the airtight seal members 30a, 30e may be provided in those grooves.

Embodiment 4

Figure 5:
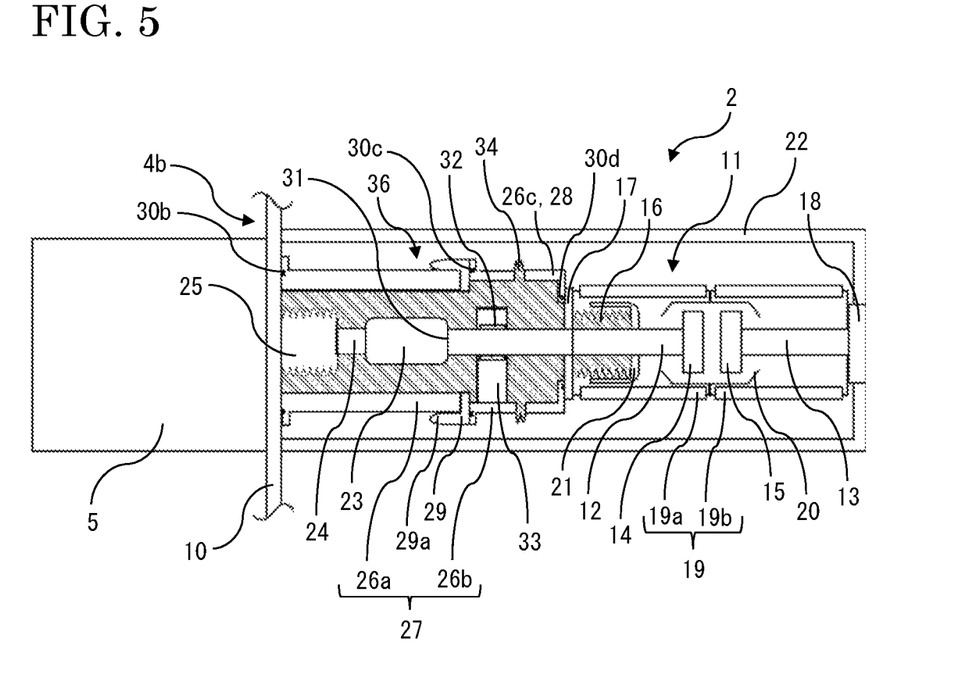
FIG. 5 is an enlarged sectional view of a part of a gas-insulated switching device according to embodiment 4.

The structure of the gas-insulated switching device 1 according to embodiment 4 will be described. FIG. 5 is an enlarged sectional view showing the circuit breaker 2 which is a part of the gas-insulated switching device 1. In embodiment 1, the first airtight container member 27 and the second airtight container member 28 are engaged with each other via the elastomer airtight seal member 30a. In embodiment 4, the first airtight container member 27 and the second airtight container member 28 are slidably engaged with each other via a metal airtight seal member. The other components are the same as those described in embodiment 1, and therefore they are denoted by the same reference characters and description thereof is omitted.

The first airtight container member 27 and the second airtight container member 28 are cylindrical-shaped members having the same diameter, and are slidably engaged with each other in parallel to the movable direction of the movable conductor 12 while being kept in an airtight state via a bellows which is a metal airtight seal member 34. Here, the case of using a metal bellows as the metal airtight seal member 34 is shown as an example. However, without limitation thereto, the first airtight container member 27 and the second airtight container member 28 may be engaged with each other via a metal thin plate flexible in the sliding direction. Providing the metal airtight seal member 34 can improve durability and environment resistance of the airtight part relevant to sliding.

As described above, the first airtight container member 27 and the second airtight container member 28 are engaged with each other via the metal airtight seal member 34, whereby durability and environment resistance in terms of airtightness for the communicating space inside pressure are improved. Thus, reliability of the intermediate pressure compartment can be improved.

Embodiment 5

Figure 6:
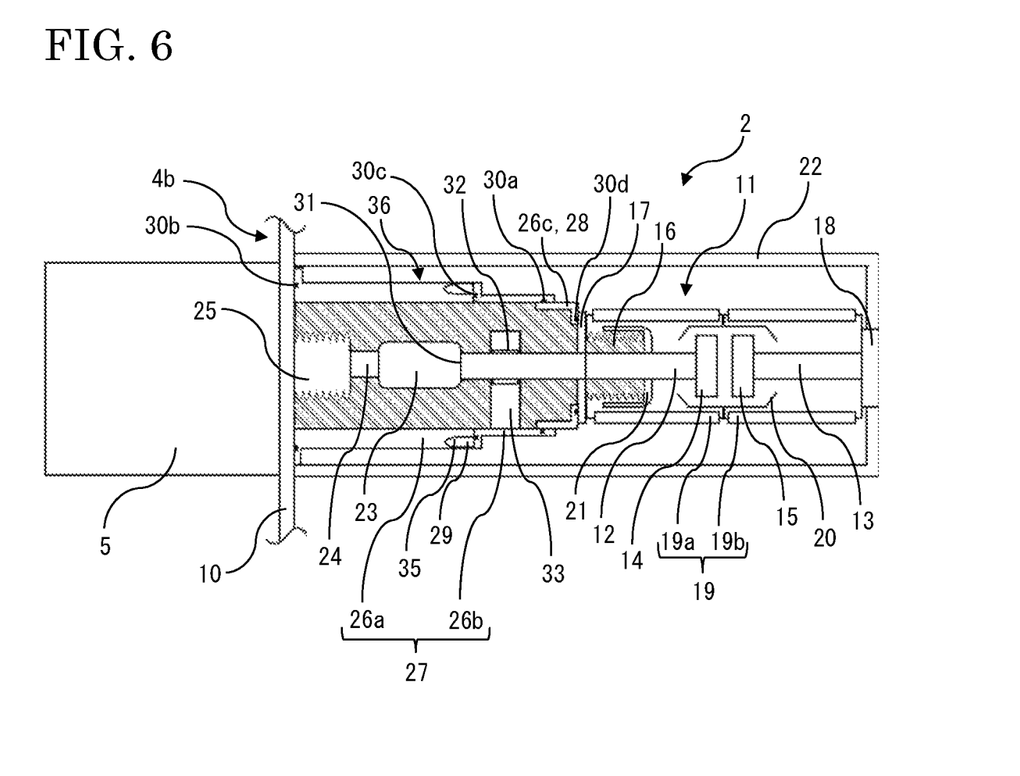
FIG. 6 is an enlarged sectional view of a part of a gas-insulated switching device according to embodiment 5.

The structure of the gas-insulated switching device 1 according to embodiment 5 will be described. FIG. 6 is an enlarged sectional view showing the circuit breaker 2 which is a part of the gas-insulated switching device 1. In embodiment 1, the airtight container member 26b is fixed to the airtight container member 26a via the electric field relaxing shield 29 formed as a separate member. In embodiment 5, the electric field relaxing shield 29 is provided so as to be embedded in the airtight container member 26a. The other components are the same as those described in embodiment 1, and therefore they are denoted by the same reference characters and description thereof is omitted.

The electric field relaxing shield 29 is provided so as to be embedded in a shield placement portion 35 formed along the outer circumferential end of the cylindrical-shaped airtight container member 26a. The airtight container member 26a can be treated as a single member including the electric field relaxing shield 29. Thus, it is not necessary to separately provide the electric field relaxing shield 29, and the components of the gas-insulated switching device 1 are decreased.

As described above, since the electric field relaxing shield 29 is provided so as to be embedded in the airtight container member 26a, the components of the gas-insulated switching device 1 are decreased. Thus, component management is facilitated, the structure of the gas-insulated switching device 1 is simplified, and the assembly process is simplified.

The electric field relaxing shield 29 is provided along the outer circumferential end of the cylindrical-shaped airtight container member 26a. However, without limitation thereto, the electric field relaxing shield 29 may be provided along the inner circumferential end.

Embodiment 6

Figure 7:
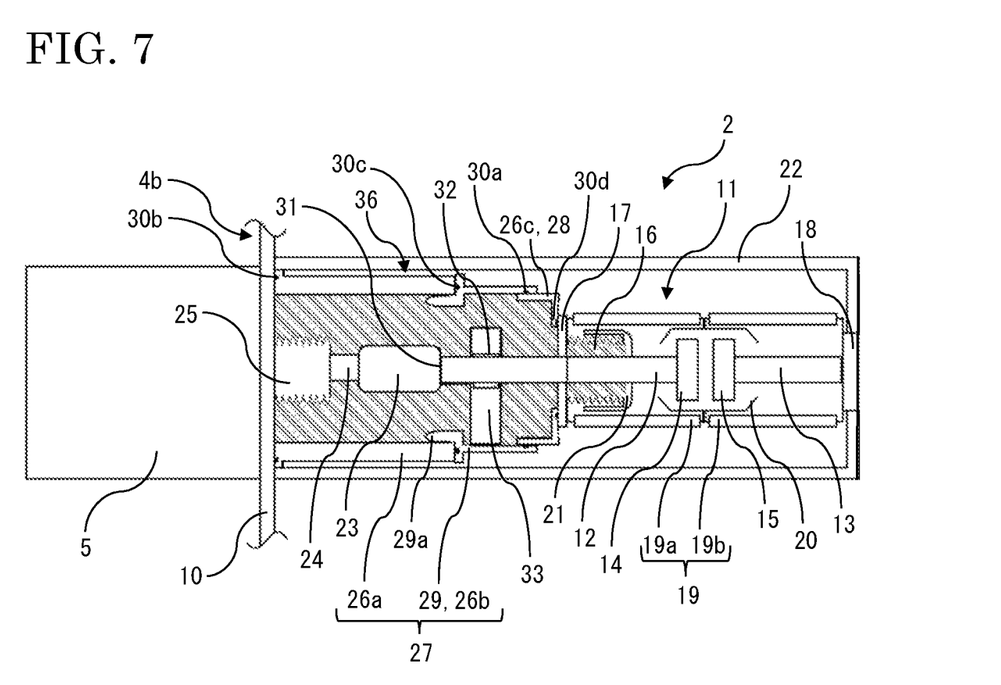
FIG. 7 is an enlarged sectional view of a part of a gas-insulated switching device according to embodiment 6.

The structure of the gas-insulated switching device 1 according to embodiment 6 will be described. FIG. 7 is an enlarged sectional view showing the circuit breaker 2 which is a part of the gas-insulated switching device 1. In embodiment 1, the airtight container member 26b is fixed to the airtight container member 26a via the electric field relaxing shield 29 formed as a separate member. In embodiment 6, the airtight container member 26b is formed by the electric field relaxing shield 29 surrounding the connection portion 31 between the movable conductor 12 and the insulation rod 23, and is fixed to the airtight container member 26a not via the electric field relaxing shield 29 formed as a separate member. The other components are the same as those described in embodiment 1, and therefore they are denoted by the same reference characters and description thereof is omitted.

The airtight container member 26b is formed as a single member integrated with the electric field relaxing shield 29, and the end portion 29a is located inside the airtight container member 26a. It is not necessary to separately provide the electric field relaxing shield 29, and the components of the gas-insulated switching device 1 are decreased. Since the end portion 29a is located inside the airtight container member 26a, the outer diameter of the airtight container member 26a is expanded as compared to the case where the end portion 29a is located on the outer side. This is for keeping the distance between the end portion 29a and the connection portion 31 substantially equal.

As described above, the airtight container member 26b is formed by the electric field relaxing shield 29, whereby the components of the gas-insulated switching device 1 are decreased. Thus, component management is facilitated, the structure of the gas-insulated switching device 1 is simplified, and the assembly process is simplified. In addition, since the end portion 29a is located inside the airtight container member 26a, the communicating space is expanded, and thus it becomes easy to make consideration for interference between the components stored inside the communicating space.

Embodiment 7

Figure 8:
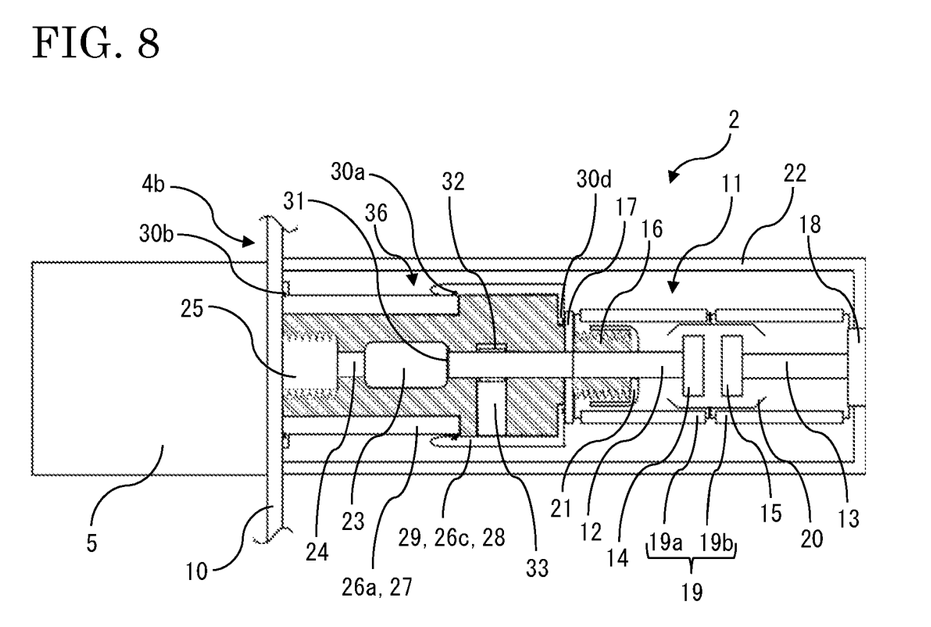
FIG. 8 is an enlarged sectional view of a part of a gas-insulated switching device according to embodiment 7.

The structure of the gas-insulated switching device 1 according to embodiment 7 will be described. FIG. 8 is an enlarged sectional view showing the circuit breaker 2 which is a part of the gas-insulated switching device 1. In embodiment 6, the airtight container member 26b is formed by the electric field relaxing shield 29 surrounding the connection portion 31 between the movable conductor 12 and the insulation rod 23, and is fixed to the airtight container member 26a not via the electric field relaxing shield 29 formed as a separate member. In embodiment 7, the airtight container member 26c is formed by the electric field relaxing shield 29 surrounding the connection portion 31 between the movable conductor 12 and the insulation rod 23, and is engaged with the airtight container member 26a via the elastic airtight seal member 30a, not via the airtight container member 26b and the electric field relaxing shield 29 formed as a separate member. The other components are the same as those described in embodiment 1, and therefore they are denoted by the same reference characters and description thereof is omitted.

The airtight container member 26c and the electric field relaxing shield 29 are formed as a single integrated cylindrical-shaped member, and the elastic airtight seal member 30a is fitted into a groove formed in the inner wall surface thereof. The airtight container member 26c is slidably engaged with the airtight container member 26a via the airtight seal member 30a. In the present embodiment, the airtight container member 26a forms the first airtight container member 27, the airtight container member 26c forms the second airtight container member 28, and the first airtight container member 27 and the second airtight container member 28 form the airtight container 36. The airtight container member 26b is not used and the airtight container member 26c can be treated as a single member including the electric field relaxing shield 29. Therefore, it is not necessary to separately provide the electric field relaxing shield 29, and the components of the gas-insulated switching device 1 are further decreased.

As described above, the airtight container member 26c is integrated with the electric field relaxing shield 29 and is engaged with the airtight container member 26a, whereby the components of the gas-insulated switching device 1 are further decreased. Thus, component management is facilitated, the structure of the gas-insulated switching device 1 is simplified, and the assembly process is simplified. In addition, the airtight sealed portions are decreased, whereby airtightness for the communicating space inside pressure is improved and thus reliability of the intermediate pressure compartment can be improved.

Embodiment 8

Figure 9:
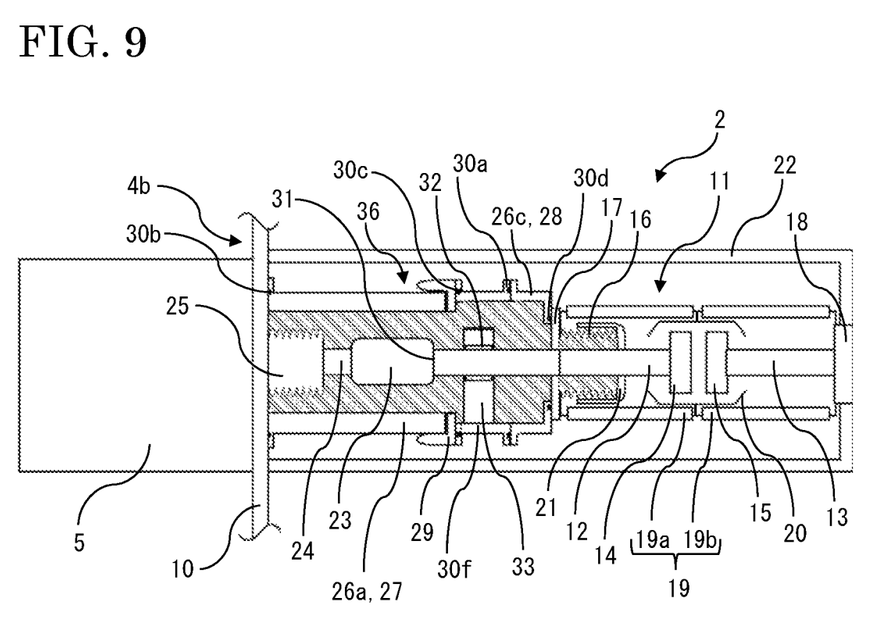
FIG. 9 is an enlarged sectional view of a part of a gas-insulated switching device according to embodiment 8.

The structure of the gas-insulated switching device 1 according to embodiment 8 will be described. FIG. 9 is an enlarged sectional view showing the circuit breaker 2 which is a part of the gas-insulated switching device 1. In embodiment 7, the airtight container member 26c integrated with the electric field relaxing shield 29 is engaged with the airtight container member 26a via the elastic airtight seal member 30a. In embodiment 8, the airtight container member 26c is engaged with the airtight container member 26a via an airtight seal member 30f which is an elastic structural material, not via the airtight container member 26b. The other components are the same as those described in embodiment 1, and therefore they are denoted by the same reference characters and description thereof is omitted.

The airtight seal member 30f is fixed to the airtight container member 26c via the airtight seal member 30a on one side, and is fixed to the airtight container member 26a via the airtight seal member 30c and the electric field relaxing shield 29 on the other side. The airtight seal member 30f is an elastic structural material, and is formed by a metal bellows, for example. In the present embodiment, the airtight container member 26a forms the first airtight container member 27, the airtight container member 26c forms the second airtight container member 28, and the first airtight container member 27 and the second airtight container member 28 form the airtight container 36.

As described above, the first airtight container member 27 and the second airtight container member 28 are engaged with each other via the airtight seal member 30f which is an elastic structural material, and therefore parts slidably fitted to each other are not provided. Thus, it is not necessary to perform precise component working considering fitting tolerance, the working process is simplified, and the assembly process is simplified.

Embodiment 9

Figure 10:
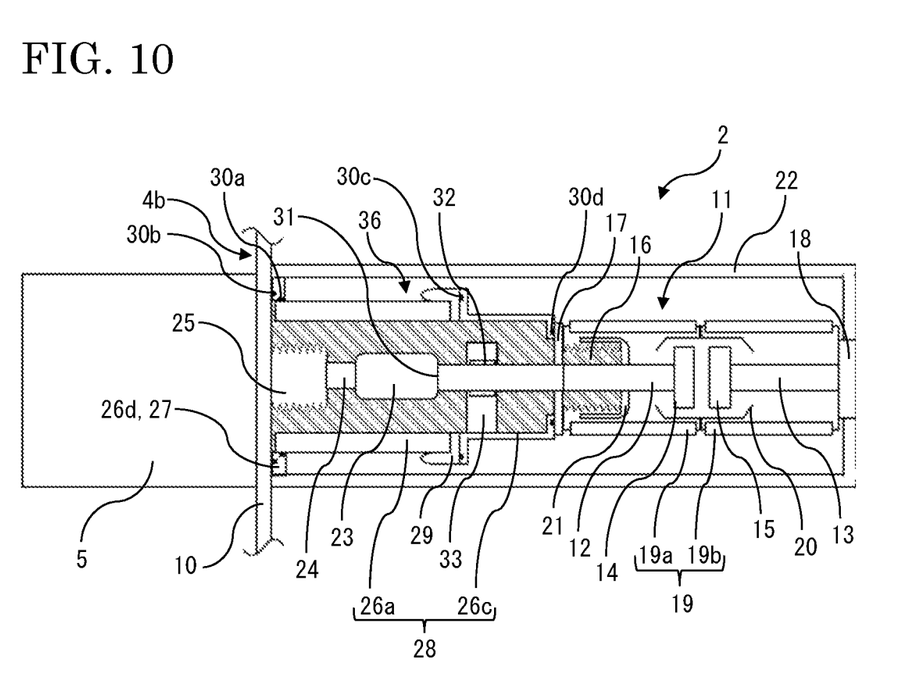
FIG. 10 is an enlarged sectional view of a part of a gas-insulated switching device according to embodiment 9.

The structure of the gas-insulated switching device 1 according to embodiment 9 will be described. FIG. 10 is an enlarged sectional view showing the circuit breaker 2 which is a part of the gas-insulated switching device 1. In embodiment 7, the airtight container member 26a is engaged with the airtight container member 26c integrated with the electric field relaxing shield 29, via the elastic airtight seal member 30a. In embodiment 9, the airtight container member 26a is engaged with an airtight container member 26d fixed to the tank wall 10 and having a different diameter, via the elastic airtight seal member 30a. The other components are the same as those described in embodiment 1, and therefore they are denoted by the same reference characters and description thereof is omitted.

The other side of the airtight container member 26d which is a cylindrical-shaped member is fixed to the tank wall 10 via the airtight seal member 30b by a bolt or the like. The elastic airtight seal member 30a is fitted into a groove formed in the inner wall surface of the airtight container member 26d. The airtight container member 26d is slidably engaged with the airtight container member 26a having a different diameter, via the airtight seal member 30a. As with the airtight container member 26c, the airtight container member 26d is not limited to an insulating material, but may be made of metal. The airtight container member 26c is fixed to the vacuum valve 11 via the airtight seal member 30d on one side, and is fixed to the airtight container member 26a via the airtight seal member 30c and the electric field relaxing shield 29 on the other side. In the present embodiment, the airtight container member 26d forms the first airtight container member 27, the airtight container member 26c and the airtight container member 26a form the second airtight container member 28, and the first airtight container member 27 and the second airtight container member 28 form the airtight container 36.

As described above, the airtight container member 26a is engaged with the airtight container member 26d fixed to the tank wall 10, via the airtight seal member 30a. Therefore, the airtight container member 26a, the airtight container member 26c, the vacuum valve 11, and the insulation support body 22 can be attached in an integrated state to the tank wall 10, and thus assembly performance can be improved.

The vacuum valve 11 is fixed to the airtight container member 26a via the airtight container member 26c. However, the vacuum valve 11 may be directly fixed to the airtight container member 26a while the electric field relaxing shield 29 is provided separately.

The configurations described in the above embodiments 1 to 9 are merely examples of the configurations according to the present disclosure, and it should be understood that the embodiments may be modified, e.g., combined with each other or partially deleted, without departing from the scope of the present disclosure.

DESCRIPTION OF THE REFERENCE CHARACTERS 1 gas-insulated switching device
2 circuit breaker
3 disconnector
4 pressure tank
5 circuit breaker drive device
6 disconnector drive device
7 cable
8 conductor
9 cubicle
10 tank wall
11 vacuum valve
12 movable conductor
13 fixed conductor
14 movable contact
15 fixed contact
16 bellows
17 movable-side end plate
18 fixed-side end plate
19 insulation cylinder
19a movable-side insulation cylinder
19b fixed-side insulation cylinder
20 arc shield
21 bellows cover
22 insulation support body
23 insulation rod
24 operation rod
25 airtight member
26 airtight container member
27 first airtight container member
28 second airtight container member
29 electric field relaxing shield
30 airtight seal member
31 connection portion
32 energization terminal
33 connection conductor
34 metal airtight seal member
35 shield placement portion
36 airtight container

The invention claimed is:

1. A gas-insulated switching device comprising, inside a pressure tank:

a vacuum valve having, in a vacuum, a movable contact provided on one side of a movable conductor, and a fixed contact provided to a fixed conductor;

an insulation rod connected to another side of the movable conductor led out through a bellows from the vacuum valve; and an airtight container in which the insulation rod and the other side of the movable conductor are stored, wherein an internal space of the bellows and an internal space of the airtight container communicate with each other, one side of the vacuum valve is fixed to a tank wall of the pressure tank via an insulation support body, another side of the vacuum valve is connected to the tank wall via the airtight container, the airtight container insulates the vacuum valve and the tank wall from each other and includes a first airtight container member and a second airtight container member, and the first airtight container member and the second airtight container member are slidable with each other in a movable direction of the movable conductor.

2. The gas-insulated switching device according to claim 1, wherein the internal space of the bellows and the internal space of the airtight container communicating with each other are filled with gas in an airtight state at a pressure lower than a pressure inside the pressure tank and higher than an atmospheric pressure.

3. The gas-insulated switching device according to claim 2, wherein the gas is dry air, $N_2$, or $CO_2$.

4. The gas-insulated switching device according to claim 1, wherein one side of the first airtight container member is fixed to the tank wall, and another side thereof is engaged with one side of the second airtight container member via an elastic airtight seal member, and another side of the second airtight container member is fixed to the vacuum valve.

5. The gas-insulated switching device according to claim 4, wherein an electric field relaxing shield surrounding a connection portion between the movable conductor and the insulation rod is provided on an outer side of the first airtight container member or an inner side of the first airtight container member, or provided so as to be embedded in the first airtight container member.

6. The gas-insulated switching device according to claim 4, wherein the second airtight container member is formed by an electric field relaxing shield, and is provided so as to surround a connection portion between the movable conductor and the insulation rod.

7. The gas-insulated switching device according to claim 4, wherein the first airtight container member and the second airtight container member are cylindrical-shaped members having diameters different from each other and engaged with each other via the airtight seal member.

8. The gas-insulated switching device according to claim 7, wherein the airtight seal member is formed by an O ring, a T ring, or an X ring.

9. The gas-insulated switching device according to claim 7, wherein a plurality of the airtight seal members are provided.

10. The gas-insulated switching device according to claim 4, wherein
an airtight container member, of the first airtight container member, that is engaged via the airtight seal member and an airtight container member, of the second airtight container member, that is engaged via the airtight seal member are truncated-cone-shaped members having diameters different from each other.

11. The gas-insulated switching device according to claim 4, wherein
the first airtight container member and the second airtight container member are cylindrical-shaped members having the same diameter and engaged with each other via a metal bellows which is the airtight seal member.

* * * * *